US012611696B2

(12) United States Patent
Kojima et al.

(10) Patent No.: US 12,611,696 B2
(45) Date of Patent: Apr. 28, 2026

(54) VIBRATORY ACTUATOR AND ELECTRONIC DEVICE

(71) Applicant: CANON KABUSHIKI KAISHA, Tokyo (JP)

(72) Inventors: Nobuyuki Kojima, Tokyo (JP); Kazuhiro Noguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 18/516,609

(22) Filed: Nov. 21, 2023

(65) Prior Publication Data

US 2024/0173746 A1 May 30, 2024

(30) Foreign Application Priority Data

Nov. 30, 2022 (JP) ................................ 2022-192159

(51) Int. Cl.
*H02K 33/10* (2006.01)
*B06B 1/02* (2006.01)

(52) U.S. Cl.
CPC ........ *B06B 1/0207* (2013.01); *B06B 2201/40* (2013.01)

(58) Field of Classification Search
CPC ....... H02P 25/032; H02P 27/085; H02P 31/00
See application file for complete search history.

(56) References Cited

U.S. PATENT DOCUMENTS

| | | | | |
|---|---|---|---|---|
| 2016/0141979 A1* | 5/2016 | Ninomiya | ............ | H02N 2/0015 310/323.01 |
| 2018/0287513 A1* | 10/2018 | Yamamoto | ........... | H10N 30/875 |
| 2021/0067059 A1* | 3/2021 | Shimada | .................. | G02B 7/08 |

FOREIGN PATENT DOCUMENTS

JP 2020137237 A 8/2020

* cited by examiner

*Primary Examiner* — David Luo
*Assistant Examiner* — Charles S Laughlin
(74) *Attorney, Agent, or Firm* — Canon U.S.A., Inc., IP Division

(57) ABSTRACT

A vibratory actuator includes a vibration body, a contact body, a base, a holding member, and a flexible substrate. The vibration body includes an elastic body and an electro-mechanical energy conversion element. The contact body is in contact with the elastic body and relatively moves with the vibration body due to vibration of the vibration body. One end of the flexible substrate is arranged along a first surface of the holding member and is folded back with respect to an end portion of the holding member toward a second surface of the holding member on a back side of the first surface, and an other end of the flexible substrate is supported by a portion of the base. The flexible substrate separates from the second surface to form a U-turn portion so that the one end and the other end of the flexible substrate are electrically connected.

6 Claims, 8 Drawing Sheets

VIBRATORY ACTUATOR AND ELECTRONIC DEVICE

BACKGROUND

Field

The present disclosure relates to a vibratory actuator and an electronic device.

Description of the Related Art

Some conventional vibratory actuators have a vibration body arranged as a driving source on the movable side and a flexible substrate connected to supply power to the driving source. Japanese Patent Application Laid-Open No. 2020-137237 discusses a vibratory actuator in which a flexible substrate includes a bend portion (U-turn portion) that bends and deforms so as not to inhibit vibration of a drive unit, and arrangement and fixation of the flexible substrate.

Of the above noted conventional vibratory actuators, there are some having a flexible substrate that includes a folded part as a means for downsizing a movable part in a driving direction. In recent years, there has been further increasing demand for improvement in the reliability and durability of electronic devices, and it is necessary to further improve the durability of a folded part of a flexible substrate.

SUMMARY

The present disclosure is directed to achieving a vibratory actuator with higher reliability and durability.

According to an aspect of the present disclosure, a vibratory actuator includes a vibration body including an elastic body and an electro-mechanical energy conversion element, a contact body in contact with the elastic body and configured to relatively move with the vibration body due to vibration of the vibration body, a base configured to support the contact body, a holding member configured to hold the vibration body and configured to move together with the vibration body in an integral manner, and a flexible substrate configured to supply power to the electro-mechanical energy conversion element, wherein one end of the flexible substrate is arranged along a first surface of the holding member and is folded back with respect to an end portion of the holding member toward a second surface of the holding member on a back side of the first surface, and an other end of the flexible substrate is supported by a portion of the base, and wherein the flexible substrate separates from the second surface to form a U-turn portion so that the one end and the other end of the flexible substrate are electrically connected.

Further features of the present disclosure will become apparent from the following description of exemplary embodiments with reference to the attached drawings.

DESCRIPTION OF THE EMBODIMENTS

Figure 1:
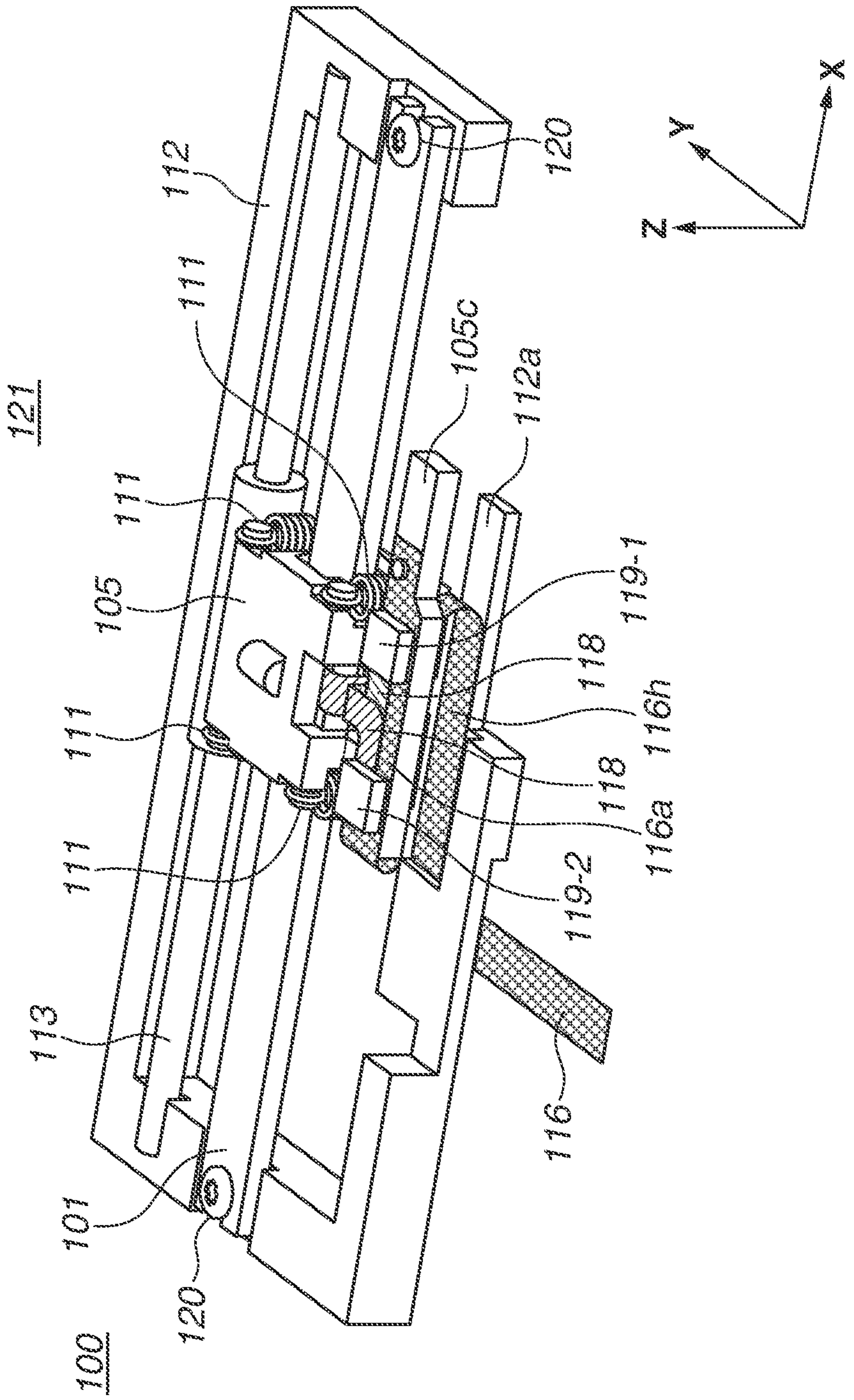
FIG. 1 is a perspective view of a vibratory actuator according to a first exemplary embodiment.

Exemplary embodiments of the present disclosure will be described in detail with reference to the accompanying drawings.

A vibratory actuator in the present exemplary embodiment includes a vibration body including an elastic body and an electro-mechanical energy conversion element, a contact body in contact with the elastic body, and a base configured to support the contact body. In the vibratory actuator with such a configuration, the vibration body and the contact body relatively move due to the vibration of the vibration body. The vibratory actuator in the present exemplary embodiment further includes a holding member configured to hold the vibration body and move together with the vibration body in an integral manner and a flexible substrate configured to supply power to the electro-mechanical energy conversion element. One end of the flexible substrate is arranged along a first surface of the holding member and is folded back with respect to an end portion of the holding member toward a second surface of the holding member on the back side of the first surface. The other end of the flexible substrate is supported by a portion of the base. In addition, the flexible substrate separates from the second surface to form a U-turn portion so that the other end and the one end are electrically connected.

The "contact body" refers to a member that is in contact with the vibration body and moves relative to the vibration body due to the vibration of the vibration body. The contact between the contact body and the vibration body is not limited to direct contact without intervention of another member between the contact body and the vibration body. The contact between the contact body and the vibration body may be indirect contact with intervention of another member between the contact body and the vibration body as far as the contact body moves relative to the vibration body due to the vibration of the vibration body. The "another member" is not limited to a member independent of the contact body and the vibration body (for example, a highly frictional material made of a sintered body). The "another member" may be a surface-treated portion of the contact body or the vibration body that is treated by plating or nitridation.

Preferred exemplary embodiments of the present disclosure will be described in detail with reference to the accompanying drawings. In the drawings, the direction of relative movement of a vibratory actuator 100 is defined as an X-axis direction, the direction of application of pressure by a pressure-applying unit described below is defined as a Z-axis direction, and a direction orthogonal to both the X-axis direction and the Z-axis direction is defined as a Y-axis direction. In each of the axis directions, one direction is defined as a positive direction, and the direction opposite to the positive direction is defined as a negative direction.

Figure 2:
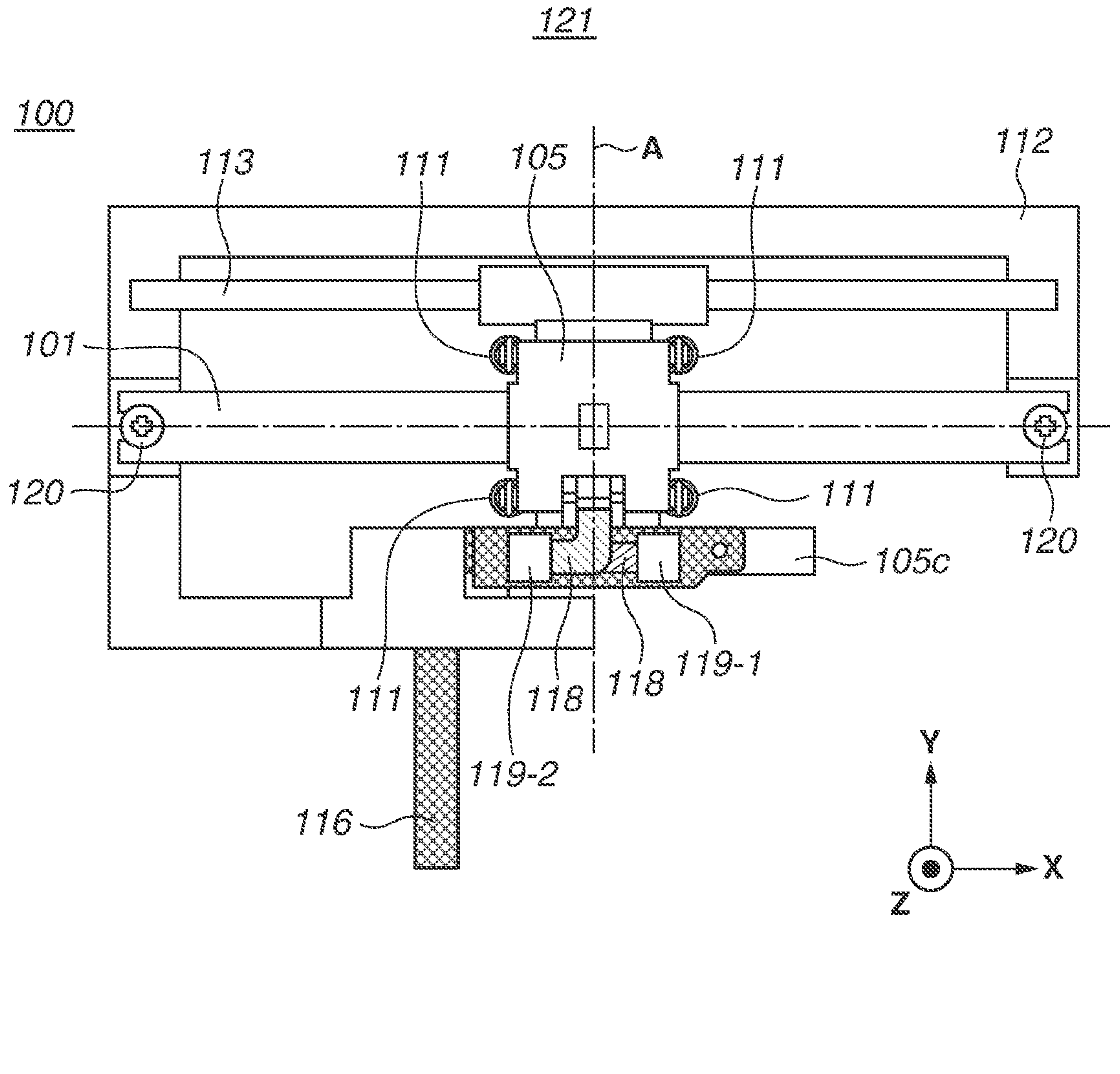
FIG. 2 is a plan view of the vibratory actuator illustrated in FIG. 1.
Figure 3:
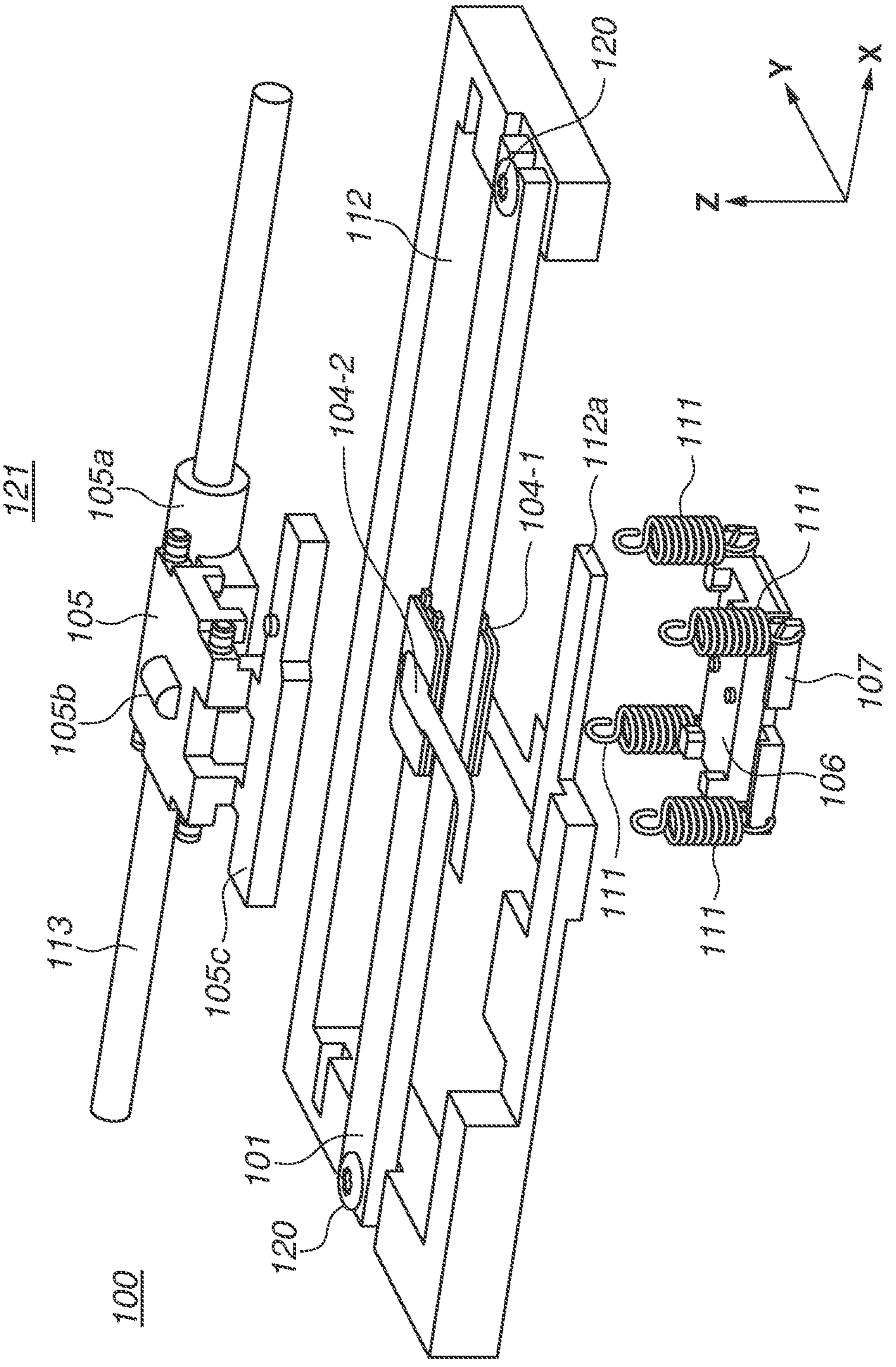
FIG. 3 is an exploded perspective view of the vibratory actuator illustrated in FIG. 1.
Figure 4A:
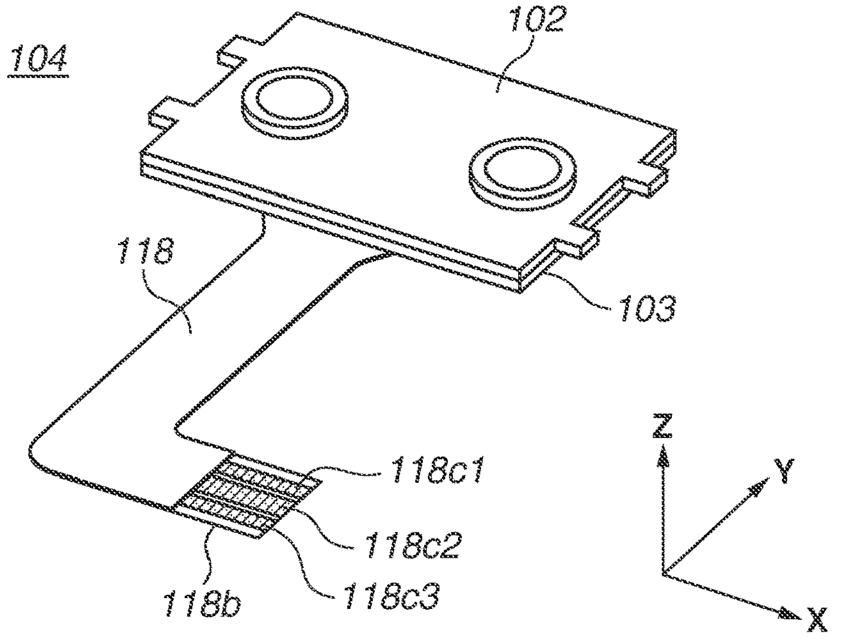
FIGS. 4A and 4B are a perspective view and a plan view of a vibration body, respectively.
Figure 4B:
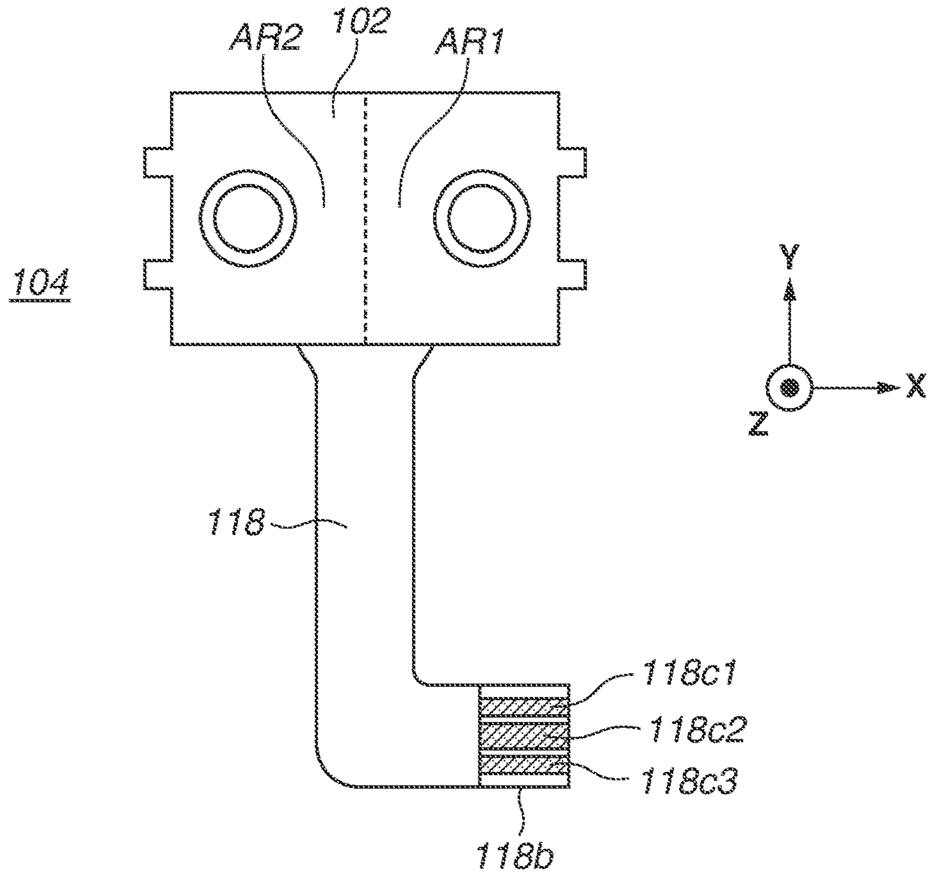
Figure 5:
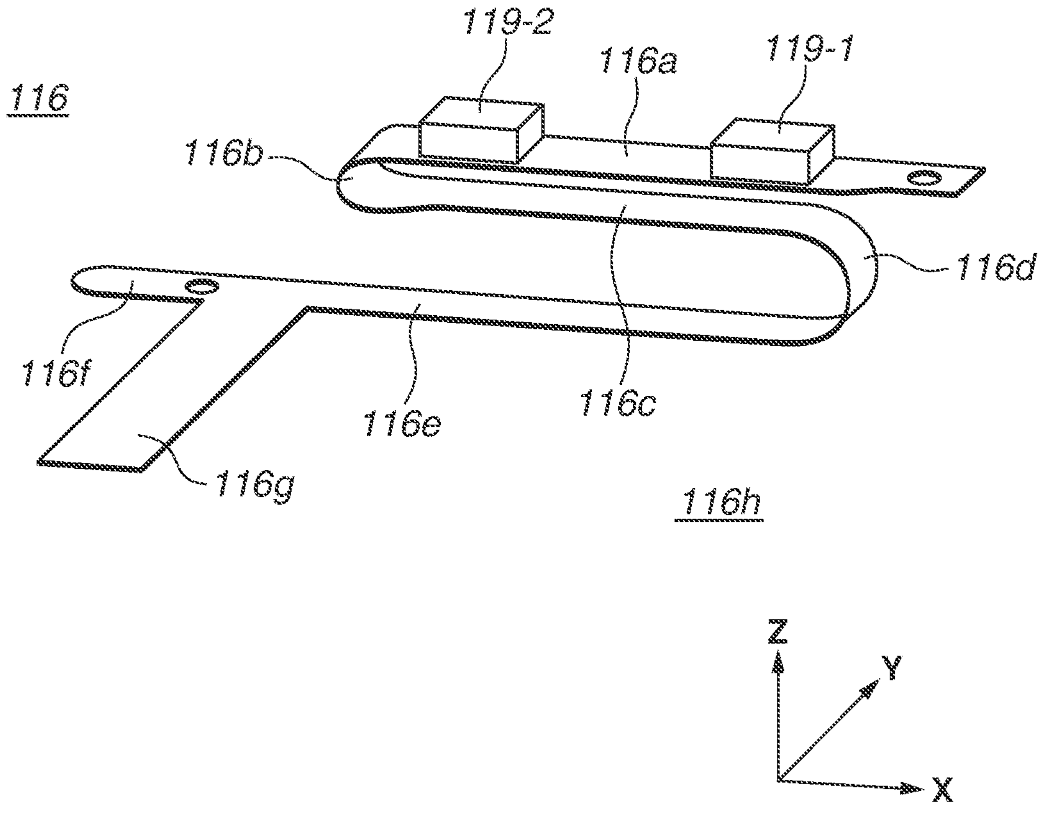
FIG. 5 is a perspective view of shapes of a fixed-side flexible substrate and electric connectors.

FIGS. 1 to 3 each illustrate a configuration of the vibratory actuator 100 in a first exemplary embodiment. FIG. 1 is a perspective view of the vibratory actuator 100 in the first exemplary embodiment. FIG. 2 is a plan view of the vibratory actuator 100. FIG. 3 is an exploded perspective view of the vibratory actuator 100. FIGS. 4A and 4B are a perspective view and a plan view of a vibration body 104, respectively. FIG. 5 depicts a fixed-side flexible substrate 116 that is a flexible substrate in the present exemplary embodiment. FIG. 5 is a perspective view of shapes of electric connectors 119 that electrically connect the flexible substrate 116 and an electro-mechanical energy conversion element to be described below in a detachable manner.

The vibratory actuator 100 in the first exemplary embodiment is constructed of members to be described below.

The vibratory actuator 100 of FIG. 1 includes a friction member 101 that is a contact body, a vibration body 104 (FIG. 4A), a vibration body holding member, a pressure-applying unit, and a guide unit.

As illustrated in FIG. 3, the vibration body holding member includes a first holding member 105, a second holding member 106, and a thin metal plate 107. The vibration body holding member functions as a holding member that holds the vibration body 104 and moves together with the vibration body 104 in an integral manner.

As further illustrated in FIG. 3, the friction member 101 that is a contact body is fixed via two screws 120 to a fixing frame member 112 that is a base. The base may be constructed of one or more members. The one or more members are fixed at relative positions, and the base supports the contact body by a portion of the member included in the base.

A fixing method is not limited to the method using the screws 120.

A guide member 113 has a substantially round bar shape and is fixed to the fixing frame member 112 with adhesion or the like. Although not illustrated in the drawing, the guide member 113 may be fixed by adding another member or tightening with screws or the like.

The vibratory actuator 100 includes two vibration bodies 104 in the present exemplary embodiment, although the number of the vibration bodies 104 is not limited to two. As illustrated in FIG. 3, these vibration body 104-1 and vibration body 104-2 are arranged so as to face each other with the friction member 101 in between.

Out of the plurality of vibration bodies included in the vibratory actuator, a first vibration body is in contact with one surface of the contact body, and a second vibration body is in contact with the other surface of the contact body. When the first vibration body and the second vibration body vibrate, the vibration body and the contact body move relative to each other.

The vibration body 104-1 is limited in position in the X and Y directions by the first holding member 105, and is held at a desired position in the Z direction by being sandwiched between the first holding member 105 and the friction member 101 that is the contact body.

The first holding member 105 includes a connection portion 105*b* to be connected to a driven member (for example, an optical lens 3 (FIG. 8) to be described below).

The second holding member 106 and the thin metal plate 107 are integrated together with adhesion or the like. The vibration body 104-2 is limited in position in the X and Y directions by the second holding member 106, and is held at a desired position in the Z direction by being sandwiched between the second holding member 106 and the friction member 101.

Four springs 111 are arranged so as to surround the two vibration bodies 104.

The springs 111 are extension coil springs, and are hooked on the first holding member 105 at one side and are hooked on the second holding member 106 at the other side. These springs 111 generate and give a pressure-applying force to the two vibration bodies 104 along the Z direction to bring the two vibration bodies 104 into frictional contact with the friction member 101 that is the contact body.

The guide member 113 is incorporated into a guide portion 105*a* formed on the first holding member 105 to form a guide unit. In the guide unit, the first holding member 105 is assembled so as to be capable of relative movement in a substantial X direction that is the axial direction of the guide member 113 and rotational movement around the axis. With this configuration, the guide unit is formed in the X-axis direction that is the direction of the relative movement.

With the configuration as described above, the vibration bodies 104 are positioned in substantial symmetry with respect to a position A illustrated in FIG. 2. The four springs 111 are also positioned in substantial symmetry with respect to the position A so that movable portions are formed so as to come close in substantial symmetry with respect to the position A.

The vibration body 104 will be described. Although the vibration body 104 described herein is preferred in the exemplary embodiment, the shape and configuration of the vibration body 104 in the present disclosure is not limited to the ones to be described below.

FIG. 4A is a perspective view of the vibration body 104, and FIG. 4B is a plan view of the vibration body 104. The vibration body 104 includes a vibration plate 102 that is an elastic body, a piezoelectric element 103 that is an electro-mechanical energy conversion element, and a vibration body flexible substrate 118. The vibration plate 102 and the piezoelectric element 103 are firmly fixed to each other with an adhesive or the like. The vibration body 104 includes the vibration body flexible substrate 118 for supplying power to the piezoelectric element 103. The vibration body flexible substrate 118 is closely bonded to the piezoelectric element 103 for fixation and electrical connection, and is externally conducted by a connector portion 118*b*.

The piezoelectric element 103 includes two drive areas that are divided in substantial symmetry with respect to the X direction. In correspondence with this, the vibration body 104 has an area AR1 and an area AR2 formed as illustrated in FIG. 4B.

As illustrated in FIG. 4B, the connector portion 118*b* of the vibration body flexible substrate 118 has three connector portion electrodes 118*c*1 to 118*c*3. These connector portion electrodes 118*c*1 to 118*c*3 are electrically connected to the piezoelectric element. When a reference potential is given to the connector portion electrode 118*c*2 and a potential difference is given to the connector portion electrode 118*c*1, the effect of stress generation is produced in the area AR2.

As described above, the two vibration bodies 104 are used in the present exemplary embodiment. These vibration bodies 104 are both configured as illustrated in FIGS. 4A and 4B, and the vibration body flexible substrates 118 are identical in shape. Since the two vibration bodies 104 are identical in shape, it is possible to facilitate assembly of the vibration bodies without the need for preparing a plurality of types of vibration bodies and to provide the ease of assembly and maintenance of the vibration bodies by preparing only one type of vibration bodies in case of a failure in any of the in-service vibration bodies.

When a high-frequency voltage is applied to the vibration body flexible substrate 118, the vibration body 104 is excited with ultrasonic vibration at a frequency in the ultrasonic range.

As described above, a pressure-applying force is given to the vibration body 104 and the friction member 101, and a force for making relative movement in the X-axis direction is generated in the vibration body 104 and the friction member 101 by the ultrasonic vibration of the vibration body 104.

The vibration body 104 making relative movement and the second holding member 106 as described above are included in a movable portion 121 of the vibratory actuator 100. When the movable portion 121 makes relative movement in the vibratory actuator 100, the vibratory actuator 100 performs an output operation in the driving direction that is the X direction illustrated in FIG. 1.

A configuration of the fixed-side flexible substrate 116 will be described. In FIGS. 1 and 2, the fixed-side flexible substrate 116 is double-hatched.

As illustrated in FIG. 1, the fixed-side flexible substrate 116 is fixed to a +Z-side surface of a bend guide 105*c* of the first holding member 105 at a movable-side fixing portion 116*a*. The two electric connectors 119 are soldered to the surface of the movable-side fixing portion 116*a* opposite to the movable-side fixing portion 116*a*.

As illustrated in FIGS. 1 and 5, the fixed-side flexible substrate 116 has a substantially round shape at a first fold-back portion 116*b* and extends from one surface to the back surface of the bend guide 105*c* that is a portion of the vibration body holding member. The fixed-side flexible substrate 116 bends and deforms to outside of the plane so as to sandwich the bend guide 105*c* and folds back in the direction of relative movement to form a first extension portion 116*c*. The fold-back portion 116*b* is bent in a substantially round shape in accordance with the thickness of the bend guide 105*c*. For this reason, the fixed-side flexible substrate 116 is distorted moderately so that the fear of disconnection is reduced to make it easy to secure the strength of this portion. This improves the durability and reliability of the vibratory actuator.

The fixed-side flexible substrate 116 bends and deforms to outside of the plane in a substantially round shape and folds back at a second fold-back portion 116*d* in the direction of the relative movement to form a second extension portion 116*e*. The second fold-back portion 116*d* forms a U-turn portion and is configured such that the vibration body and the contact body move relative to each other and separate from the bend guide 105*c* that is a portion of the holding member.

The fixed-side flexible substrate 116 is fixed to the fixing frame member 112 at a fixing portion 116*f*. The fixed-side flexible substrate 116 extends in the Y-axis direction and then forms a connection portion 116*g* to be connected to an external connection portion not illustrated.

As illustrated in FIG. 1, the vibration body flexible substrates 118 included in the vibration bodies 104 are inserted into the electric connectors 119 for electrical connection. The flexibility of the vibration body flexible substrates 118 is used for positioning the vibration body flexible substrates 118 in the electric connectors 119.

Although the electrical connection using the electric connectors 119 is disclosed in the present exemplary embodiment, the present disclosure is not limited to this configuration, and soldering or the like may be used.

The first extension portion 116*c*, the second fold-back portion 116*d*, and the second extension portion 116*e* illustrated in FIG. 5 are arranged as described below. That is, these portions are guided by the bend guide 105*c* of the first holding member 105 and a guide surface 112*a* of the fixing frame member 112 illustrated in FIG. 1 to form a substantially U-shaped bend portion (U-turn portion) in the pressure-applying direction. The bend guide 105*c* and the guide surface 112*a* extend in the X-axis direction that is the direction of relative movement. The fold-back position of the second fold-back portion 116*d* is changeable along with the relative movement of the movable portion 121 in the X-axis direction. Thus, along with the relative movement of the movable portion 121, the position of the second fold-back portion 116*d* changes in the direction of relative movement. Accordingly, the electrical connection is maintained in accordance with changes in the relative positions of the first fold-back portion 116*b* on the movable side and the fixing portion 116*a* on the fixed side of the fixed-side flexible substrate 116.

According to this configuration, the first extension portion 116*c*, the second fold-back portion 116*d*, and the second extension portion 116*e* of the fixed-side flexible substrate 116 act or function as a bend region 116*h*. The bend region 116*h* is arranged so as to extend in the driving direction, including the position A illustrated in FIG. 2.

That is, one end of the flexible substrate is arranged along the first surface of the holding member and is folded back with respect to the end portion of the holding member toward the second surface of the holding member on the back side of the first surface. The other end of the flexible substrate is supported by a portion of the base, and the flexible substrate separates from the second surface to form a U-turn portion, so that the other end and the one end are electrically connected.

The one end of the flexible substrate and the piezoelectric element that is an electro-mechanical energy conversion element are electrically connected via a detachable connector. The connector may be arranged on the first surface.

Description of the relative movement of the movable portion 121 and the action of the second fold-back portion 116*d* (U-turn portion) of the fixed-side flexible substrate 116 along with the relative movement is omitted here.

As illustrated in FIG. 1, the bend region 116*h* and the movable-side fixing portion 116*a* of the fixed-side flexible substrate 116 are folded back in the driving direction with the bend guide 105*c* in between, so that these portions projectively overlap in the Z direction. This arrangement makes it possible to secure the ease of assembly and maintenance of the vibration body 104 and suppress increase in the dimension of the fixed-side flexible substrate 116 in the X direction that is the driving direction to downsize the movable portion in the driving direction.

Figure 6:
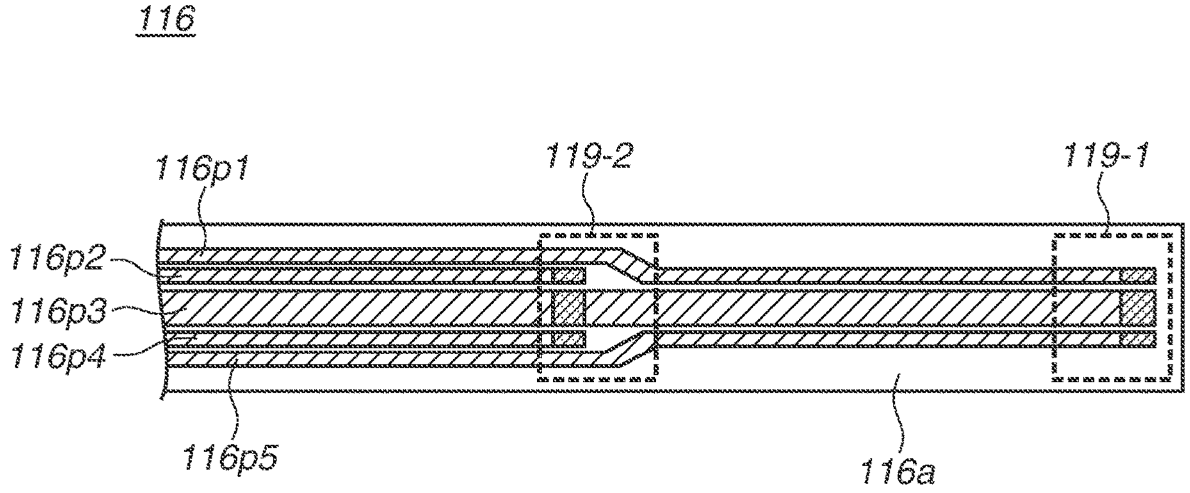
FIG. 6 is a partial view of electrode patterns on the fixed-side flexible substrate.

An electrode configuration of the movable-side fixing portion 116*a* will be described with reference to FIG. 6. The movable-side fixing portion 116*a* has five electrode patterns 116*p*1 to 116*p*5 illustrated in hatch lines. The electrode patterns 116*p*1 to 116*p*5 are connected to connection electrodes not illustrated at the connection portion 116*g*. The parts illustrated by hatch lines in the drawing are covered with a cover and isolated from the outside. The electrodes at the parts illustrated by double-hatch lines are exposed and are electrically connected to the two electric connectors 119-1 and 119-2 schematically illustrated. The electric connectors described herein include double-purpose structural parts that include both an upper contact and a lower contact, and can be electrically continuous even when the connector portion 118*b* of the vibration body flexible substrate 118 is inserted in either orientation.

The two vibration bodies 104-1 and 104-2 are arranged as illustrated in FIG. 3. The vibration body 104-1 is connected to the electric connector 119-1 in the orientation illustrated in FIG. 4B. The electrode pattern 116*p*1 and the connector portion electrode 118c1, the electrode pattern 116p3 and the connector portion electrode 118c2, the electrode pattern 116p5 and the connector portion electrode 118c3 are electrically connected. With the potential of the electrode pattern 116p3 as a reference potential, a potential difference is given to the electrode patterns 116p1 and 116p5 to generate stress in the areas AR1 and AR2 of the vibration body 104-1 as described above.

As illustrated in FIG. 3, the vibration body 104-2 is rotated by 180 degrees around the Y axis in FIG. 4B, and is connected to the electric connector 119-2 in this orientation. In the positional relationship illustrated in FIGS. 4B and 5, the electrode pattern 116p2 and the connector portion electrode 118c1, the electrode pattern 116p3 and the connector portion electrode 118c2, the electrode pattern 116p4 and the connector portion electrode 118c3 are electrically connected. With the potential of the electrode pattern 116p3 as a reference potential, a potential difference is given to the electrode patterns 116p1 and 116p3 to generate stress in the areas AR1 and AR2 of the vibration body 104-2 as described above.

In order to generate driving forces in the same direction in the two vibration bodies 104, the vibration bodies 104 are brought into a vibrating state in a substantial symmetry with respect to the friction member 101 in between. For this end, the area AR1 of the vibration body 104-1 and the area AR2 of the vibration body 104-2 generate stress at substantially identical timing. Then, the area AR2 of the vibration body 104-1 and the area AR1 of the vibration body 104-2 are brought into a vibrating state in which stress is generated at substantially identical timing that is different from the above timing. In order for the two vibration bodies 104 to act like this, an identical potential difference is given to the electrode pattern 116p1 and the electrode pattern 116p4 with the potential of the electrode pattern 116p3 as a reference potential, and a different potential difference is given to the electrode pattern 116p2 and the electrode pattern 116p5.

It may not be required that driving forces in the same direction are generated in the two vibration bodies 104, depending on the desired driving state of the vibratory actuator 100. For example, in order for the vibratory actuator 100 to stably operate at a very low speed, the two vibration bodies 104 are caused to generate forces in the opposite directions, and the difference between the forces is used as a driving force. The vibratory actuator 100 may be operated by giving an arbitrary potential difference to the electrode patterns 116p1, 116p2, 116p4, and 116p5 with the potential of the electrode pattern 116p3 as a reference potential to bring the two vibration bodies 104 into different driving states.

A configuration of a vibratory actuator can be adopted in which power is supplied to electro-mechanical energy conversion elements of a first vibration body and a second vibration body via a flexible substrate in common.

Figure 7:
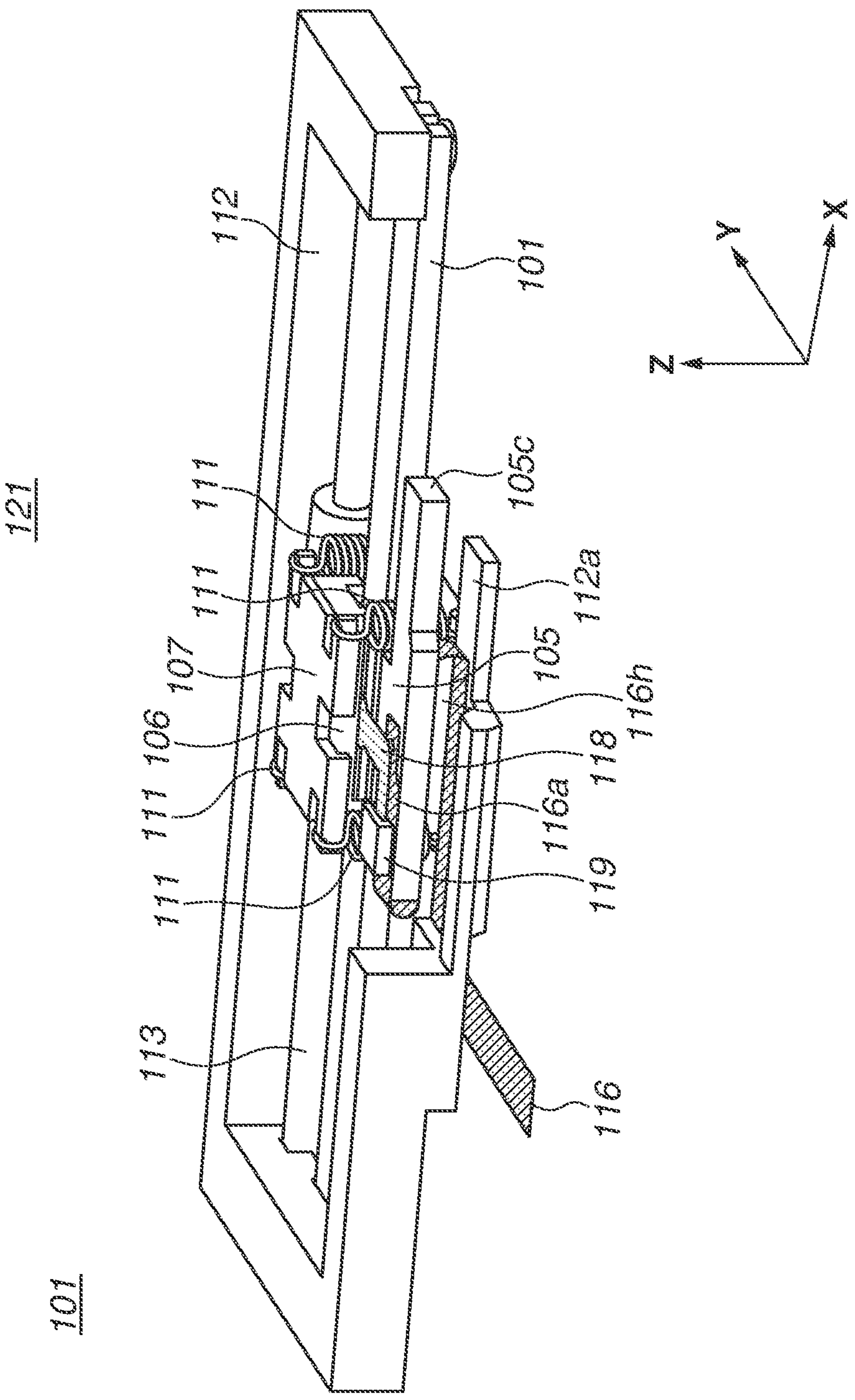
FIG. 7 is a perspective view of a vibratory actuator according to another aspect of the first exemplary embodiment.

FIG. 7 is a perspective view of a vibratory actuator 101 according to another aspect of the present exemplary embodiment. As in the above-described exemplary embodiment, a bend region 116h and a movable-side fixing portion 116a of a fixed-side flexible substate 116 are folded back in the driving direction with a bend guide 105c in between so as to projectively overlap in the Z direction, whereby it is possible to obtain advantageous effects similar to those of the above-described exemplary embodiment.

A second exemplary embodiment will be described. An example of an electronic device including a member and the above-described vibratory actuator that drives the member will be exemplified.

Figure 8:
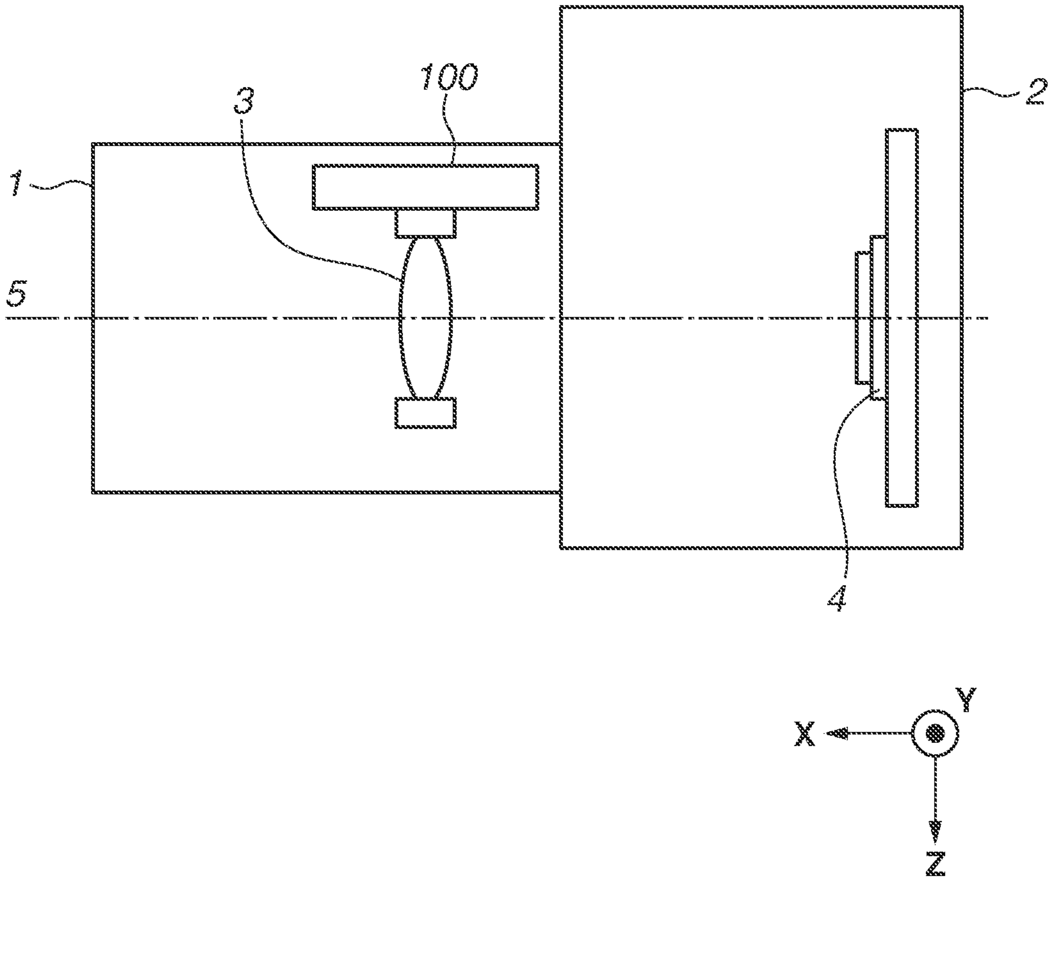
FIG. 8 is a schematic diagram illustrating a configuration of an imaging apparatus to which the vibratory actuator is applied.

FIG. 8 illustrates a configuration of an imaging apparatus to which the vibratory actuator 100 of the first exemplary embodiment is applied. In the description below, the imaging apparatus is equipped with a lens-barrel driving device including the vibratory actuator 100. However, the present disclosure is not limited to this configuration. In the imaging apparatus, an imaging lens portion 1 and a camera body 2 to be described below are integrated. Alternatively, the imaging lens portion 1 may be a replaceable lens.

The imaging apparatus main body includes the imaging lens portion 1 and the camera body 2. Inside the imaging lens portion 1, an optical lens 3 is coupled to the vibratory actuator 100. When the movable portion 121 included in the vibratory actuator 100 moves, the optical lens 3 is movable in a direction substantially parallel to an optical axis 5. The lens-barrel including the optical lens 3 and the vibratory actuator 100 are included in the lens-barrel driving device in the present disclosure. In the lens-barrel driving device in which the optical lens 3 is a focus lens, at the time of imaging, the focus lens moves in the direction substantially parallel to the optical axis 5, and an image of the subject is formed on an imaging element 4 in the camera body 2, so that the in-focus image can be generated.

Preferred exemplary embodiments and application examples of the present disclosure have been described. However, the present disclosure is not limited to these exemplary embodiments, and can be modified and changed in various manners within the scope of the gist of the present disclosure.

According to the present disclosure, it is possible to achieve a vibratory actuator with high reliability and durability.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-192159, filed Nov. 30, 2022, which is hereby incorporated by reference herein in its entirety.

What is claimed is:

1. A vibratory actuator comprising:

a vibration body including an elastic body and an electro-mechanical energy conversion element;

a contact body in contact with the elastic body and configured to relatively move with the vibration body due to vibration of the vibration body;

a base configured to support the contact body;

a holding member configured to hold the vibration body and configured to move together with the vibration body in an integral manner; and a flexible substrate configured to supply power to the electro-mechanical energy conversion element, wherein one end of the flexible substrate is arranged along a first surface of the holding member and is folded back with respect to an end portion of the holding member toward a second surface of the holding member on a back side of the first surface, and an other end of the flexible substrate is supported by a portion of the base, wherein the flexible substrate forms a U-turn portion including a third surface disposed to be parallel to the second surface, and wherein the one end and the other end of the flexible substrate are electrically connected.

2. The vibratory actuator according to claim 1, wherein the one end of the flexible substrate and the electro-mechanical energy conversion element are electrically connected via a detachable connector.

3. The vibratory actuator according to claim 2, wherein the detachable connector is arranged on the first surface.

4. The vibratory actuator according to claim 1, wherein, out of a plurality of vibration bodies included in the vibratory actuator, a first vibration body is in contact with one surface of the contact body, and a second vibration body is in contact with the other surface of the contact body, and wherein, when the first vibration body and the second vibration body vibrate, the vibration body and the contact body move relative to each other.

5. The vibratory actuator according to claim 4, wherein power is supplied to electro-mechanical energy conversion elements of the first vibration body and the second vibration body via the flexible substrate in common.

6. An electronic device comprising:

a member; and the vibratory actuator according to claim 1 configured to drive the member.

* * * * *